Feb. 2, 1971 D. A. BOELTER 3,560,979
METHOD AND ELECTRICAL CIRCUIT FOR PROCESSING AIRPORT RUNWAY
LOCALIZER AND GLIDESLOPE INFORMATION
Filed Dec. 2, 1968

INVENTOR
DONALD A. BOELTER

> United States Patent Office 3,560,979
Patented Feb. 2, 1971

3,560,979
METHOD AND ELECTRICAL CIRCUIT FOR PROCESSING AIRPORT RUNWAY LOCALIZER AND GLIDESLOPE INFORMATION
Donald A. Boelter, Indianapolis, Ind., assignor to General Aviation Electronics, Inc., Indianapolis, Ind., a corporation of Indiana
Filed Dec. 2, 1968, Ser. No. 780,491
Int. Cl. G01s 1/16
U.S. Cl. 343—109                                6 Claims

ABSTRACT OF THE DISCLOSURE

An electrical circuit for processing airport runway localizer or glideslope information having first and second active RC low pass filters connected in series and phase-shifting the demodulated output of a radio receiver to provide the input to a 180° phase splitter having two outputs 180° out of phase, a pair of summing amplifiers, each for summing one of the phase splitter outputs with the demodulated output of the radio receiver, a pair of detectors, one connected to the output of each summing amplifier and an indicator connected between the outputs of the detectors.

BACKGROUND OF THE INVENTION

Field of the invention

The field of the invention is generally airport radio, and more particularly, airport glidepath radio.

Description of the prior art

The output of a navigation radio receiver, when tuned to a localizer or a glideslope frequency, is a combination of a 90 Hz. and a 150 Hz. signal in time lock. The positional information is contained in the relative amplitudes of the 90 Hz. and 150 Hz. signals. To be meaningful to the pilot, this amplitude difference must be converted to a meter movement or other visual indication.

The most obvious method of processing the 90 Hz. and 150 Hz. signals is to separate them with tuned circuits while maintaining their relative amplitudes. By rectifying and filtering the separated signals, two DC voltages may be provided that are proportional to the amplitudes of the 90 Hz. and 150 Hz. signals. These may then be applied differentially to an indicator for presentation to the pilot. This has been the method generally used by prior art apparatus.

The problems attendant this method are that tuned circuits in the 90 Hz. and 150 Hz. frequency range are physically large and relatively expensive. When made of a physical size reasonable for aircraft installation, they have low Q. Additionally, maintaining the amplitude relation between the two signals when they propagate through different channels is difficult, especially with the wide variations in temperature encountered in the usual aircraft environment.

Another method that has been used in the prior art is to feed the output of the navigational radio receiver to a bridged-T phase shift network which advances the phase of the 150 Hz. signal. A similar network retards the phase of the 90 Hz. signal. In each case the original signal is shifted about 90°, however, in actual practice less shift is generally accepted. The two phase-shifted signals are then combined in a phase discriminator, the rectified outputs of which are then fed differentially to an indicator.

This method, too, has several problems. Bridged-T networks are generally very critical to tuning, and slight mistuning will produce large errors in the output indicator. Phase discriminator transformers at the 90 Hz. to 150 Hz. frequency range are generally large, or if made small, are quite expensive. Additionally, the temperature and time stability of practical circuits for processing the information according to this method are generally poor.

The method and circuit of the present invention overcomes each of the problems and difficulties attendant the methods and apparatus of the prior art. In addition to achieving much better temperature and time stability than the two prior art methods described, the circuit of the present invention uses no inductors or transformers, resulting in low weight and low cost. Active RC low pass filters are used to shift the phases of the signals. These are very noncritical to element value, and small errors or shifts in circuit parameters produce only small errors in output indication.

SUMMARY OF THE INVENTION

The present invention comprises an improved method and circuit for processing airport runway localizer or glideslope information. One of the primary features of the present invention is that it eliminates the need for inductors or transformers in the circuit, thereby greatly reducing both the weight and the cost of the equipment. At the same time, the use of active RC filters to phase shift the signals minimizes the effect of parameter values, or of changing parameter values, upon the stability of the circuits.

One embodiment of the present invention might employ two active RC low pass filters connected in series or cascade. The demodulated output of a navigation radio receiver is fed to the first filter, which in turn feeds the second. The output of the second filter feeds a 180° phase splitter which provides two outputs 180° out of phase. These in turn are fed to two summing amplifiers, where each is summed with the demodulated output of the navigation radio receiver to produce two summed signals. Each of the summed signals is fed to a detector which rectifies its respective signal. The outputs of the detectors are fed differentially to an indicator, which indicates whether the aircraft is on its proper approach path to the runway.

It is therefore an object of the present invention to provide an improved method and circuit for processing airport runway localizer and glide-slope information.

It is another object of the present invention to provide a more stable circuit for processing said information.

It is still another object of the present invention to provide a circuit weighing less than any of the prior art apparatus for processing said information.

It is yet another object of the present invention to provide a circuit that is more stable than prior art circuits.

It is also an object of the present invention to provide a circuit that is reliable, will require little maintenance, and is inexpensive.

These and other objects and advantages of the present invention will become apparent as the description proceeds, reference being had to the attached drawings and appended claims.

DESCRIPTION OF THE PREFERRED EMBODIMENTS

Figure 1:
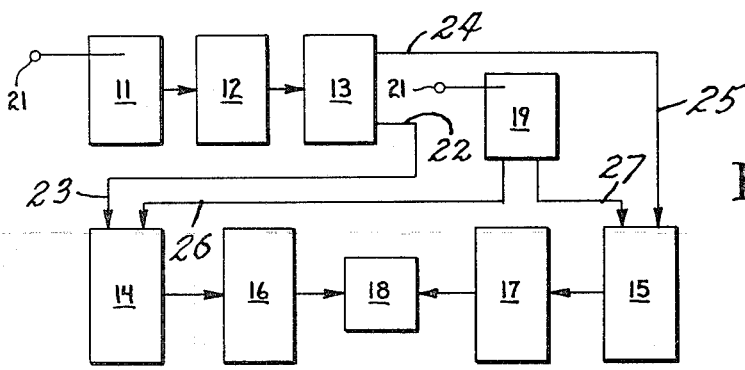
FIG. 1 is a block diagram showing the functional operation of the circuit of the present invention.

Referring now to FIG. 1 there is shown a block diagram of the preferred embodiment of the present invention, showing both the functional relationship between the major subdivisions of the circuit and the steps in the method of processing the information.

The circuit of the present invention is indicated generally by the numeral 10. Its major subdivisions, employing nomenclature representative of the function each performs, include a first active RC low pass filter 11, a second active RC low pass filter 12, a phase splitter 13, a first summing amplifier 14, a second summing amplifier 15, a first detector 16, a second detector 17, a differential indicator 18, and an adjustable attenuator 19.

The first active RC low pass filter 11 has an input terminal 21, which is connected to the demodulated output of a navigational radio receiver. The demodulated signal of the navigational radio receiver contains the localizer or glideslope information in the form of two signals, one a 90 Hz. sine wave and the other a 150 Hz. sine wave in phase lock relationship. The transmitting antenna system is arranged so that with the approaching aircraft directly on path, the amplitude of the two signals is equal. If the aircraft is off the path, the signal strength of one of the signals will increase and the other will decrease.

It will be understood that both glideslope and localizer information is transmitted in the same manner. That is, glideslope information is transmitted on one carrier frequency and localizer information is transmitted on another carrier frequency. Each carrier frequency is received by a navigational radio aboard the aircraft. The modulating signals of both carriers are 90 Hz. and 150 Hz. Therefore, the outputs of the two navigational radios with which we are presently concerned are of the same character, that is, demodulated signals containing a 90 Hz. and a 150 Hz. sine wave in phase lock relationship.

If the aircraft is on the proper guideslope, but is off to the right or left of the glidepath, the localizer receiver output will contain that information in the amplitude difference between its 90 Hz. and 150 Hz. signal. Similarly, if the aircraft is above or below the proper glideslope, the glideslope, receiver will contain that information in the amplitude difference between its 90 Hz. and 150 Hz. signals.

In view of the foregoing, it will be apparent that the circuit about to be described in detail is equally suited for processing both glideslope and localizer information and giving the aircraft pilot a visual indication of his location with respect to the proper glidepath. In practice, two circuits according to the present invention would be used in each aircraft, one to process the glideslope information and the other to process the localizer information. Also, in practice, the two indicators may be contained within a common housing having two needles or pointers, one indicating horizontal position (localizer) and the other indicating vertical position (glideslope).

Referring again to FIG. 1, the output of the first active RC low pass filter 11 provides the input to the second active RC low pass filter 12. Each of the low pass filters 11 and 12 has circuit parameters selected to provide a 45° phase shift at 115 Hz. In each, the 90 Hz. signal will be shifted less than the 150 Hz. signal. By connecting the two low pass filters in series, the result is that the 90 Hz. signal is shifted less than 90° while the 150 Hz. signal is shifted more than 90°. It should be noted here that notwithstanding the differential phase shift between the two signals, they are not altered in relative amplitude because the filters 11 and 12 have a response that is essentially flat to 200 Hz.

The output of the second active RC low pass filter is fed to the input of a 180° phase splitter 13 which provides two outputs 180° out of phase.

One output of the 180° phase splitter 13, indicated at 22 provides a first input 23 for the summing amplifier 14 while the other output, indicated at 24, provides a first input 25 for the summing amplifier 15.

Each of the summing amplifiers 14 and 15 have second inputs 26 and 27, respectively. The inputs 26 and 27 are connected through the adjustable attenuator 19 to the input 21 of the first active RC low pass filter.

Thus, it will be seen that the two inputs to the summing amplifier 14 carry the original demodulated signal and a differentially phase shifted signal while the two inputs to the summing amplifier 15 carry the original demodulated signal and a differentially phase shifted and inverted signal.

It will now be apparent to those skilled in the art that the output of the summing amplifier 14 is a complex waveform that has an average amplitude that is proportional to the amplitude of the 90 Hz. signal at the input terminal 21 while the output of the summing amplifier 15 is a complex waveform that has an average amplitude that is proportional to the amplitude of the 150 Hz. signal at the input terminal 21.

The outputs of each of the summing amplifiers 14 and 15 are fed to detectors 16 and 17, respectively, which rectify the complex waveforms and produce a DC voltage output that is proportional to the average amplitude of the complex waveforms, and therefore, proportional to their respective 90 Hz. and 150 Hz. signals at terminal 21.

The outputs of the detectors are then differentially applied to the indicator 18, which gives a visual indication of the relative amplitudes of the two applied signals.

Figure 2:
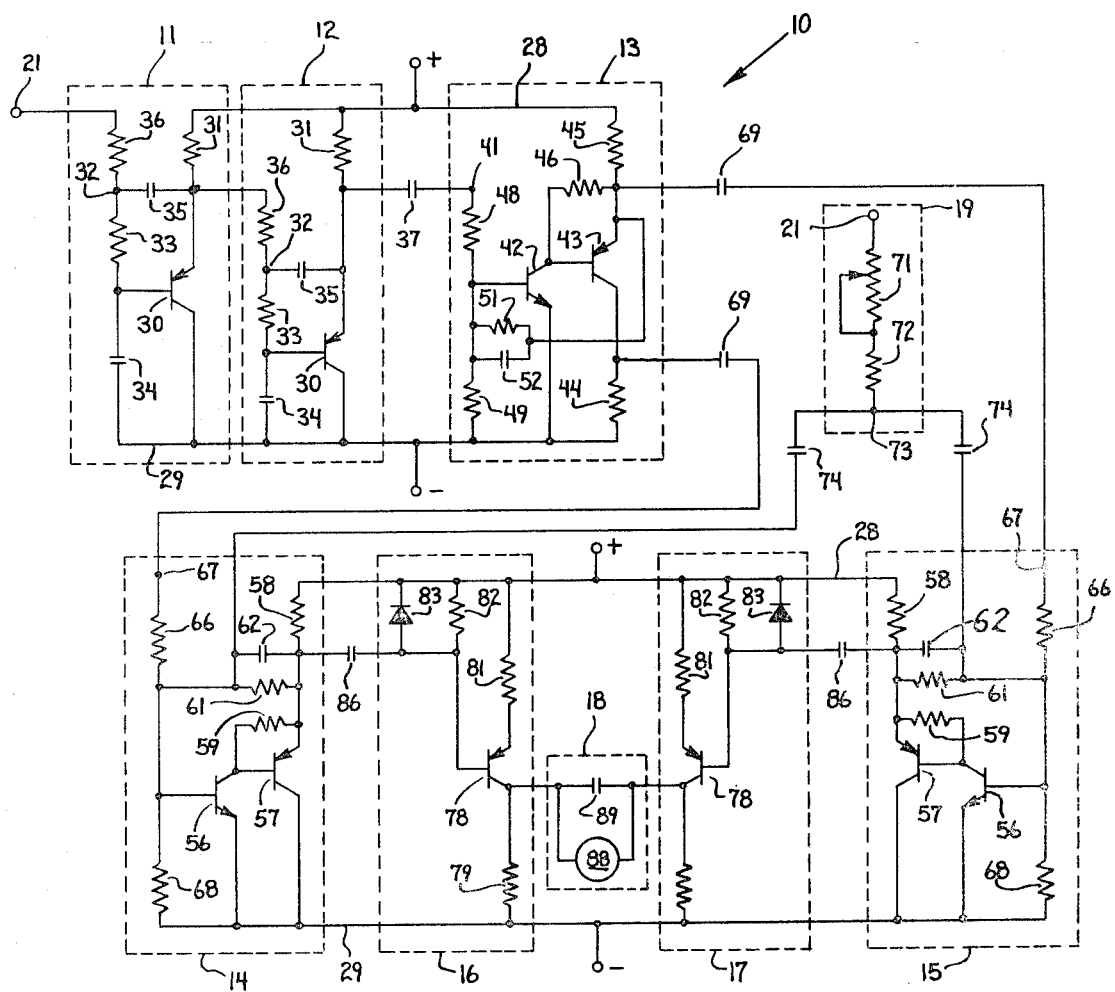
FIG. 2 is a detailed schematic diagram of the circuit of the present invention, with broken lines to indicate the relationship of the circuit components to the block diagram of FIG. 1.

Referring now to FIG. 2, there is shown a detailed schematic of the circuit of the present invention. Boxes indicated in broken lines show the relationship between the schematic and the block diagram of FIG. 1.

The circuit 10 is powered by an 8.5 volt DC source, indicated by the terminals marked (+) and (−) connected to conductors 28 and 29 respectively.

Each of the active RC low pass filters, 11 and 12, have a transistor 30, having an emitter, a base and a collector. The collector of transistor 30 is connected to conductor 29 and its emitter is connected through a bias resistor 31 to conductor 28. Between a junction 32 and the base of transistor 30 there is connected a resistor 33. A capacitor 34 is connected between the base of transistor 30 and conductor 29. A capacitor 35 is connected between junction 32 and the emitter of transistor 30. The input to each of the filters 11 and 12 is to junction 32 through a resistor 36. The output of each of the filters 11 and 12 is taken at the emitter of transistor 30. Resistor 36 of filter 11 is connected between terminal 21 and junction 32 of filter 11 while resistor 36 of filter 12 is connected between the emitter of transistor 30 of filter 11 and the junction 32 of filter 12.

The output of filter 12 is applied to the 180° phase splitter 13 through a coupling capacitor 37 connected between the emitter of transistor 30 of filter 12 and a junction 41 of phase splitter 13.

Phase splitter 13 has two transistors, 42 and 43, each having an emitter, a base and a collector. The collector of the transistor 43 is connected through a resistor 44 to the conductor 29 while its emitter is connected through a resistor 45 to conductor 28. The collector of transistor 42 is connected to the base of transistor 43 and through a bias resistor 46 to the emitter of transistor 43. A resistor 48 is connected between input junction 41 and the base of transistor 42 while a resistor 49 is connected between the base of transistor 42 and the conductor 29. A resistor 51 and a capacitor 52 are connected in parallel between the emitter of transistor 43 and the base of transistor 42. The phase splitter 13 has two outputs, one taken at the collector of transistor 43 and the other taken at the emitter of transistor 43.

The two summing amplifiers 14 and 15 each have a transistor 56 and a transistor 57. The emitter of transistor 56 and the collector of transistor 57 are connected to conductor 29. The emitter of transistor 57 is connected through a resistor 58 to the conductor 28 while the collector of transistor 56 is connected through a resistor 59 to the emitter of transistor 57. A resistor 61 and a capacitor 62 are connected in parallel between the base of transistor 56 and the emitter of transistor 57. A resistor 66 is connected between a junction 67 and the base of transistor 56 and a resistor 68 is connected between the base of transistor 56 and conductor 29. Each of the summing amplifiers 14 and 15 has two inputs, one being at the junction 67 and the other being at the base of transistor 56. The output of the phase splitter 13, taken at the collector of transistor 43, is connected through a capacitor 69 to junction 67 of summing amplifier 14. The output of phase splitter 13 taken at the emitter of transistor 43 is connected through another capacitor 69 to the junction 67 of summing amplifier 15.

The adjustable attenuator 19 has a variable resistor 71 connected in series with a resistor 72 between terminal 21 and an output junction 73. The output junction 73 is connected to the base of transistor 56 of each of the summing amplifiers 14 and 15 through capacitors 74, thus providing the second input to each of the summing amplifiers 14 and 15.

Each of the detectors 16 and 17 has a transistor 78, having an emitter, a base and a collector. The collector of transistor 78 is connected through a resistor 79 to conductor 29. The emitter of transistor 78 is connected through a resistor 81 to conductor 28. A resistor 82 and a diode 83 are connected in parallel between the base of transistor 78 and conductor 28, with the diode being connected so that it is reverse biased. The output of summing amplifier 14, taken at the emitter of transistor 57, is connected through a capacitor 86 to the base of transistor 78 of detector 16. Similarly, the output of summing amplifier 15, taken at the emitter of transistor 57, is connected through another capacitor 86 to the base of transistor 78 of detector 17.

An indicator 88 is connected between the outputs of detectors 16 and 17, the outputs being taken at the collectors of transistors 78. A capacitor 89 may be connected in parallel with the indicator 88.

Typical values of the circuit components of the preferred embodiment are: resistor 31, 10K; resistor 33, 120K; capacitor 34, .0068 μf.; capacitor 35, .033 μf; resistor 36, 22K; resistors 44 and 45, 1K; resistor 46, 15K; resistor 48, 100K; resistor 49, 39K; resistor 51, 470K; capacitor 52, .0022 μf.; resistor 58, 1K; resistor 59, 10K; resistor 61, 464K; capacitor 62, .0082 μf.; resistor 66, 100K; resistor 68, 82K; capacitor 69, .01 μf.; variable resistor 71, 20K; resistor 72, 10K; capacitor 74, .022 μf.; resistors 79 and 81, 221 ohms (1%); resistor 82, 10K; capacitor 86, 125 μf.; capacitor 89, 4000 μf. The indicator 89 may be a center zero meter movement having a relatively high impedance. All PNP transistors may be 3N5139 and all NPN transistors may be 2N5135.

It will be seen that the above disclosed method and circuit for processing airport runway localizer and glideslope information provides many advantages over prior known methods and circuits. It is light in weight, time and temperature stable and inexpensive compared to other known circuits.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A circuit for processing airport runway localizer and glideslope information comprising:
    first and second active RC low pass filters connected in series;
    a phase splitter connected to the second active RC low pass filter and providing two outputs 180° out of phase;
    a pair of summing amplifiers each having two inputs and an output;
    one input of each summing amplifier being connected to one of the two outputs of the phase splitter;
    the other input of each summing amplifier being connected through an adjustable attenuator to the input of the first active RC low pass filter;
    a pair of detectors each having an input and an output;
    the input of each detector being connected to the output of one of the summing amplifiers; and
    an indicator connected differentially between the outputs of said pair of detectors.

2. The invention according to claim 1 wherein said information is contained in the relative amplitudes of first and second signals having a first and a second frequency, respectively; each of said active RC low pass filters being tuned to a third frequency intermediate said first and second frequencies.

3. The invention according to claim 2 wherein said first frequency is 90 Hz., said second frequency is 150 Hz. and said third frequency is 115 Hz.

4. The invention according to claim 3 wherein said active RC low pass filters have a response that is flat to approximately 200 Hz., thereby assuring that the relative amplitudes of said first and second signals will not be changed by said active RC low pass filters.

5. The invention according to claim 1 wherein said phase splitter is a circuit containing a transistor amplifier wherein said 180°-out-of-phase-outputs are taken from said transistor amplifier.

6. The invention according to claim 1 wherein said first and second active RC low pass filters are also frequency sensitive phase shifters.

References Cited
UNITED STATES PATENTS

| | | | |
|---|---|---|---|
| 3,281,846 | 10/1966 | King, Jr. | 343—107 |
| 3,302,202 | 1/1967 | Gouriet | 343—109 |

RODNEY D. BENNETT, Jr., Primary Examiner

R. E. BERGER, Assistant Examiner

U.S. Cl. X.R.

343—108